June 5, 1951     A. P. WITHALL     2,555,432
FRICTION SHOCK ABSORBER

Filed May 15, 1948     2 Sheets-Sheet 1

Inventor:
Albert P. Withall.
By Henry Fuchs
Attys.

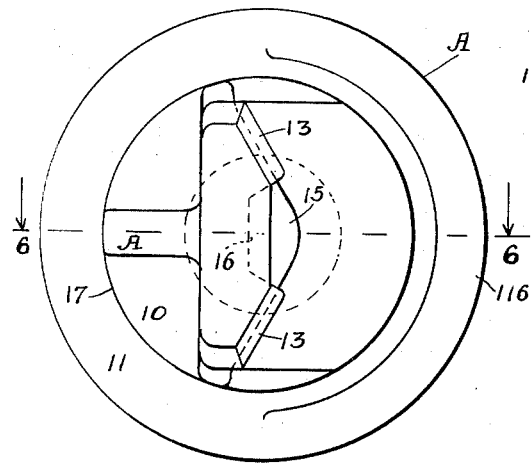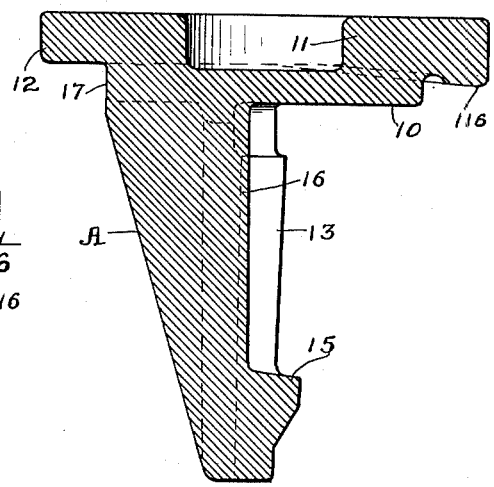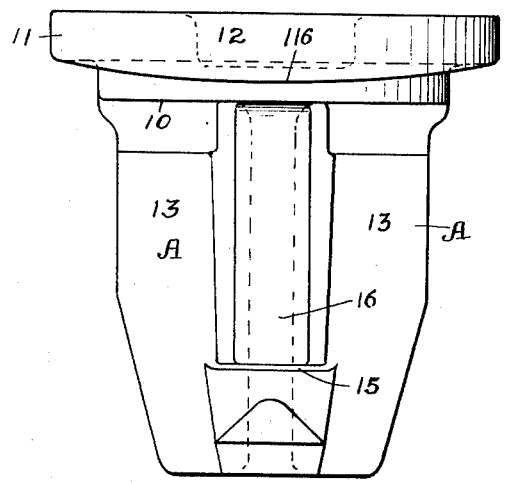

Patented June 5, 1951

2,555,432

UNITED STATES PATENT OFFICE 2,555,432

FRICTION SHOCK ABSORBER

Albert P. Withall, Chicago, Ill., assignor to W. H. Miner, Inc., Chicago, Ill., a corporation of Delaware Application May 15, 1948, Serial No. 27,347

1 Claim. (Cl. 267—9)

This invention relates to improvements in friction shock absorbers, especially adapted for use for snubbing the action of railway car truck springs.

One object of the invention is to provide a friction shock absorber, comprising a pair of relatively slidable friction elements and spring means opposing lengthwise relative movement of the elements toward each other and pressing the elements into tight frictional engagement with each other, wherein the friction elements are in the form of relatively slidable friction posts having interengaging friction surfaces of tongue and groove formation to prevent lateral displacement of the friction elements during operation of the mechanism.

Other objects of the invention will more clearly appear from the description and claim hereinafter following.

Figure 1:
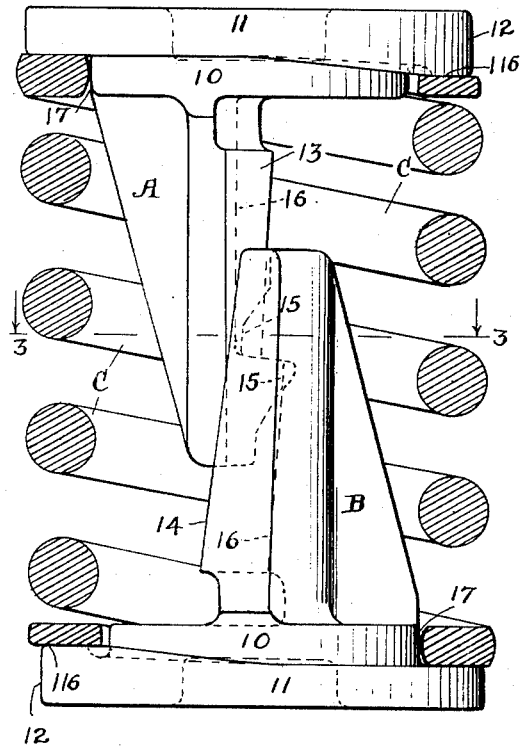
Figure 2:
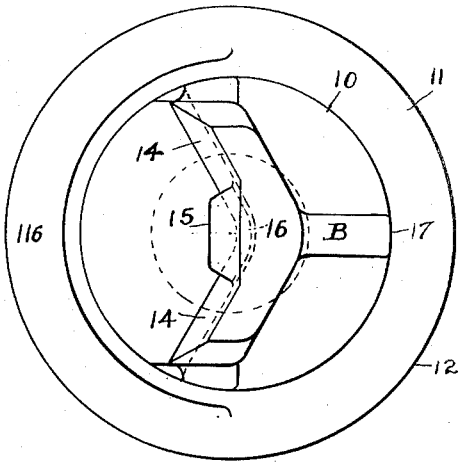
Figure 3:
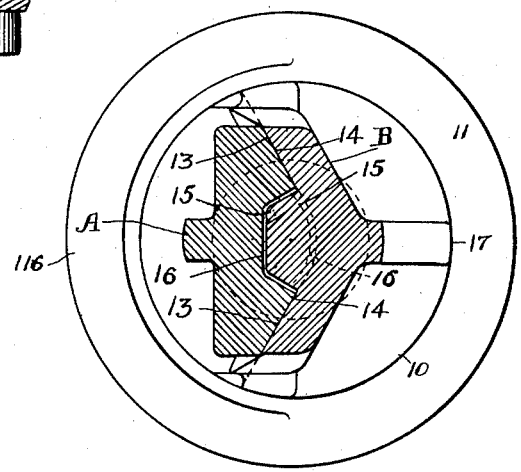
Figure 4:
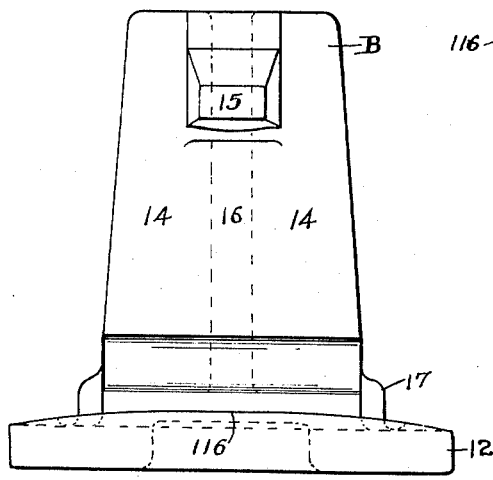

In the drawings forming a part of this specification, Figure 1 is a side elevational view of my improved friction snubber, illustrating the spring resistance member in transverse vertical section. Figure 2 is a top plan view of the lower friction element shown in Figure 1. Figure 3 is a transverse horizontal sectional view, corresponding substantially to the line 3—3 of Figure 1, with the spring member omitted. Figure 4 is an elevational view of Figure 2, looking from left to right in said figure. Figure 5 is a bottom plan view of the upper friction element shown in Figure 1. Figure 6 is a transverse vertical sectional view, corresponding substantially to the line 6—6 of Figure 5. Figure 7 is a side elevational view of Figure 5, looking from right to left in said figure.

My improved shock absorber comprises broadly top and bottom friction posts A and B, and a spring member C, yieldingly opposing relative lengthwise movement of the posts toward each other.

The friction posts A and B are of similar design, except as hereinafter pointed out. Each post is provided with a cylindrical base portion 10 at its inner end and a laterally extending annular flange 11, projecting from said base portion, concentric with the vertical central axis of the mechanism, said base portion 10 and flange 11 together forming a follower plate or disc member 12. The base portion 10 of each post is slightly eccentric with respect to the vertical central axis of the mechanism. The two posts A and B are reversely arranged, that is, the post A is inverted with respect to the post B. As shown most clearly in Figure 1, the follower plate 12 of the post A is located at the top end of the mechanism and has the post depending therefrom, while the follower plate 12 of the lower post B is located at the bottom end of the mechanism and has the post upstanding therefrom. On their inner sides, the posts A and B are provided with lengthwise extending, interengaging friction surfaces 13 and 14, respectively, the surface 13 of the post A projecting therefrom and being of V-shaped transverse section, and the cooperating surface 14 of the post B being of V-shaped transverse section to slidingly fit the surface of the post A. As shown, the friction surfaces 13 and 14 are inclined slightly with respect to the longitudinal axis of the mechanism. At the outer end thereof, each post has a laterally outwardly projecting lug 15, the lugs 15—15 of the two posts cooperating to limit lengthwise separation of the friction posts. As shown, the inner surface of each post is slotted rearwardly of the lug 15 thereof, as indicated at 16, to accommodate the lug 15 of the other post for sliding movement.

The spring resistance member C, which is in the form of a helical coil, surrounds the posts A and B and bears at its top and bottom ends on the top and bottom follower plate members 12—12. The follower plate members 12—12 are preferably crowned on their inner sides, as indicated at 116—116, to conform to the tang end of the spring and provide proper bearing support for the same.

The spring C is under initial compression and the inner sides of the top and bottom coils bear on the outer sides of the eccentric base portions of the posts A and B, respectively, at opposite sides of the mechanism, as indicated at 17—17 in Figure 1. Inasmuch as the cylindrical base portions of the posts A and B are eccentric to the central vertical axis of the spring C and the mechanism, as a whole, there is substantial clearance between the inner sides of the end coils of the spring and the base portions 10—10 of the posts at the sides of the mechanism diametrically opposed to the zones of contact 17—17 of said base portions with the spring.

My improved shock absorber preferably replaces one or more of the spring units of a truck spring cluster, being interposed between the usual top and bottom spring plates which cooperate with said cluster.

The operation of the improved shock absorber is as follows: Upon the spring cluster of the truck of a railway car being compressed between the spring follower plates of the cluster, the shock absorbing unit, which is disposed between said follower plates, is compressed therewith, thereby forcing the post A downwardly toward the post B against the resistance of the spring C, sliding the same along their friction surfaces. During this lengthwise relative movement of the posts, lateral displacement of the same with respect to each other, which might otherwise occur, due to eccentric loading, is effectively prevented by the interengaging tongue and groove formation of the friction surfaces thereof.

Upon release of the mechanism, the posts A and B are restored to the normal position shown in Figure 1 by the expansive action of the spring C, longitudinal separation of the posts being limited by engagement of the lugs 15—15 with each other.

I claim:

In a friction shock absorbing mechanism, the combination with upper and lower spring followers; of a post depending from said upper spring follower at one side of the longitudinal axis of the mechanism, said post having a single, longitudinally extending friction surface of projecting, V-shaped, transverse cross section; a second post upstanding from said lower follower, said posts being at diametrically opposite sides of the central longitudinal axis of said mechanism, said last named post having a single friction surface on the inner side extending lengthwise thereof, said surface being of reentrant, V-shaped, transverse cross section and interfitting with the projecting V-shaped surface of the first named post; a lug at the outer end of each post projecting from the friction surface of the same and engageable with the lug of the other post to limit lengthwise separation of said posts; and a coil spring surrounding said posts and having engagement at its top and bottom ends with said followers, said spring having lateral bearing engagement with the posts at the follower ends thereof to hold the same in frictional engagement with each other.

ALBERT P. WITHALL.

REFERENCES CITED

The following references are of record in the file of this patent:

UNITED STATES PATENTS

| Number | Name | Date |
| --- | --- | --- |
| 2,091,783 | Lazna | Aug. 31, 1937 |
| 2,388,229 | Light | Oct. 30, 1945 |
| 2,410,165 | Johnson et al. | Oct. 29, 1946 |